(12) United States Patent
Wang et al.

(10) Patent No.: US 7,113,366 B1
(45) Date of Patent: Sep. 26, 2006

(54) DOUBLE-NOSED INDUCTIVE TRANSDUCER WITH REDUCED OFF-TRACK WRITING

(75) Inventors: Yugang Wang, Milpitas, CA (US); Kroum Stoev, Fremont, CA (US); Francis Liu, Fremont, CA (US); Yingjian Chen, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 145 days.

(21) Appl. No.: 10/290,880

(22) Filed: Nov. 7, 2002

(51) Int. Cl.
*G11B 5/187* (2006.01)

(52) U.S. Cl. .................................. 360/126

(58) Field of Classification Search .......... 360/126, 360/317
See application file for complete search history.

(56) References Cited

U.S. PATENT DOCUMENTS

| | | | |
|---|---|---|---|
| 3,723,665 A * | 3/1973 | Lazzari et al. | 360/123 |
| 4,921,508 A * | 5/1990 | Nonaka | 29/603.15 |
| 5,384,680 A * | 1/1995 | Mallary | 360/126 |
| 5,801,910 A | 9/1998 | Mallary | 360/126 |
| 5,805,391 A | 9/1998 | Chang et al. | 360/317 |
| 6,122,144 A | 9/2000 | Chang et al. | 360/122 |
| 6,301,076 B1 | 10/2001 | Stageberg et al. | 360/126 |
| 6,327,116 B1 * | 12/2001 | Watanabe et al. | 360/126 |
| 6,525,904 B1 * | 2/2003 | Sasaki | 360/126 |
| 6,742,241 B1 * | 6/2004 | Sasaki | 29/603.07 |
| 6,826,012 B1 * | 11/2004 | Sasaki | 360/126 |
| 6,826,014 B1 * | 11/2004 | Lam et al. | 360/126 |
| 6,870,712 B1 * | 3/2005 | Chen et al. | 360/317 |
| 2002/0030929 A1 * | 3/2002 | Sasaki | 360/126 |
| 2003/0048581 A1 * | 3/2003 | Ohtomo et al. | 360/126 |
| 2003/0053251 A1 * | 3/2003 | Yoshida et al. | 360/126 |

* cited by examiner

*Primary Examiner*—Angel Castro
(74) *Attorney, Agent, or Firm*—Jonathan E. Prejean, E; Sawyer Law Group LLP

(57) ABSTRACT

A thin film electromagnetic head has an inductive transducer with a double-nosed ferromagnetic trailing pole layer. The trailing pole layer has a trailing pole tip disposed adjacent to a media-facing surface, a trailing pole yoke disposed distal to the media-facing surface, and a trailing pole nose disposed between the trailing pole tip and the trailing pole yoke. The media-facing surface extends as a substantially flat surface in all directions from the trailing pole tip. The length of the trailing pole nose may be at least twice as long as the trailing pole tip length. The width of the trailing pole nose can be 10 to 30 times as wide as the trailing pole tip width. An inductive transducer having a double-nosed trailing pole layer provides a higher ratio of on-track to off-track write fields, thereby improving the density with which data can be written to the recording media. Such a double-nosed trailing pole layer can be used in transducers for either longitudinal or perpendicular magnetic recording.

6 Claims, 10 Drawing Sheets

DOUBLE-NOSED INDUCTIVE TRANSDUCER WITH REDUCED OFF-TRACK WRITING

BACKGROUND OF THE INVENTION

The present invention relates to electromagnetic transducers, which may for example be employed in thin film inductive write heads of the type formed on the trailing ends of air bearing sliders used in magnetic recording disk drives.

An inductive transducer used for writing and/or reading magnetic information on storage media, such as a disk or tape, typically includes electrically conductive coil windings that encircle a magnetic core. The magnetic core has leading and trailing pole layers. The pole layers have pole tip portions adjacent to the recording media. The magnetic core is interrupted by a submicron nonmagnetic gap disposed between the pole tip portions to divert magnetic flux to the media during writing. To write to the media, electric current is flowed through the coil windings, which produces magnetic flux in the core encircling the coil windings, the magnetic flux fringing across the nonmagnetic gap adjacent to the media so as to write bits of magnetic field information in tracks on the recording media.

The leading pole layer is typically substantially flat, whereas the trailing pole layer can be curved in order to cover coil windings and insulation disposed between the pole layers. Alternatively, the trailing pole layer can be flat if a pedestal adjacent to the recording media is magnetically coupled to either the leading or the trailing pole layer. In that case, the submicron nonmagnetic gap is located between the pedestal and the pole layer to which it is not magnetically coupled.

The width of the pole tip portion, which corresponds to the track width, may be decreased to allow more tracks to be written on the recording media. As track width is decreased, however, it becomes more difficult to transmit high-intensity magnetic flux through the pole tip portion. A standard technique for increasing the strength of the magnetic field at the pole tip surface has been to increase the magnetic moment of the material near both the pole tip surface and the recording gap. One way to accomplish this is to form a pedestal of material having a high magnetic moment between a pole layer and the recording gap, increasing the magnetic field at the edge of the pole tip surface adjoining the gap.

As noted above, the trailing pole layer and/or pedestal may have a flared or tapered width near the region around the pole tip surface in which the sides are parallel. Various geometries of tapered pole layers near the pole tip portions have been used, such as the geometries depicted in FIGS. 2A–2D. In all of the geometries shown in FIGS. 2A–2D, the sides 80 immediately adjacent to the pole tip surfaces 82 are parallel. In each of the geometries, after a flare point 84, the width of the pole layer increases more or less at a steady rate extending away from the pole tip surface 82. It is also possible that tapered pole layers may have curved regions adjacent pole tip sides.

FIG. 2C is an attempt to replicate the shape of a pole layer disclosed in U.S. Pat. No. 6,055,137 to Ishiwata et al. Ishiwata et al. teach that when the width of the pole-like distal end portion of the other magnetic pole decreases, the magnetic anisotropy of the other magnetic pole becomes difficult to form, and tends to be formed in an undesirable direction. Ishiwata et al. avoid that undesirable magnetic anisotropy by shaping the pole tip with a focused ion beam (FIB) that ablates parts of a trailing pole tip. The "recessed portions" that remain adjacent the pole tip would disrupt the air-bearing surface, however, as well being difficult to form. Moreover, should the FIB be slightly misdirected and cut into the leading pole tip, the etched corners of the leading pole layer may create funnels for off-track flux.

SUMMARY

A geometry of a pole layer is disclosed that increases the amount of high magnetic moment material near the pole tip surface while limiting off-track writing produced by such material. Such geometry may increase a magnetic flux to be transmitted through the pole tip surface while avoiding leakage of such magnetic flux onto the recording media from areas of the pole layer other than the pole tip surface. For example, an inductive transducer is disclosed that has a double-nosed ferromagnetic trailing pole layer disposed adjacent to electrically conductive coil sections, which are also disposed adjacent to a leading pole layer. The trailing pole layer has a trailing pole tip disposed adjacent to a media-facing surface, a trailing pole yoke disposed distal to the media-facing surface, and a trailing pole nose disposed between the trailing pole tip and the trailing pole yoke. This summary merely lists a few aspects of the disclosure while the invention is defined by the claims appended below.

DETAILED DESCRIPTION OF THE PREFERRED EMBODIMENTS

Figure 1A:
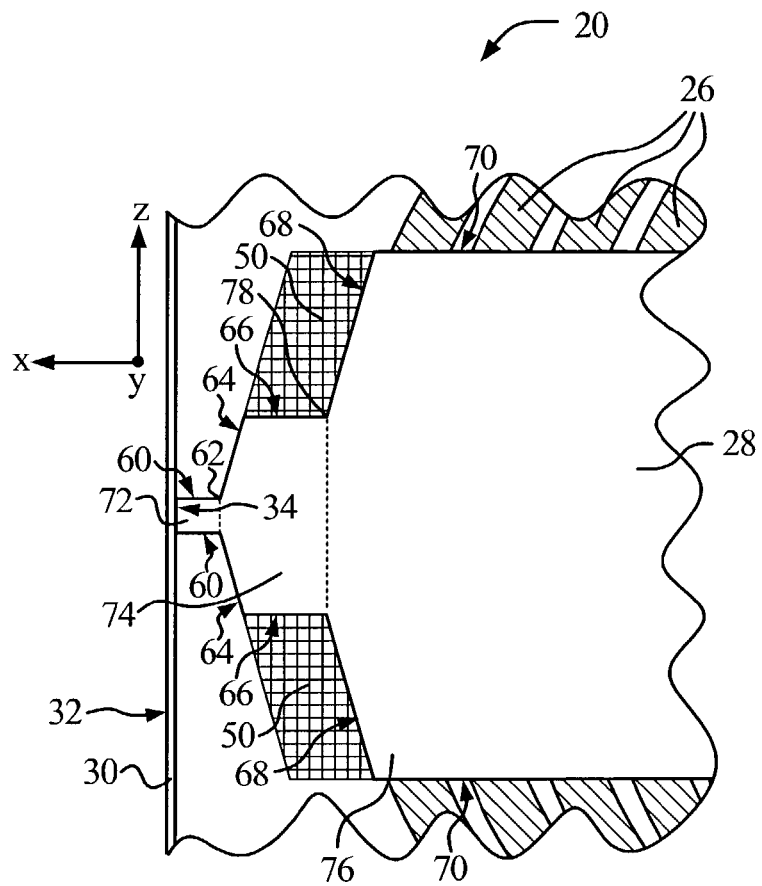
FIG. 1A is a cutaway, opened-up view of a transducer having a double-nosed pole layer with a pole nose between the pole yoke and the pole tip.
Figure 1B:
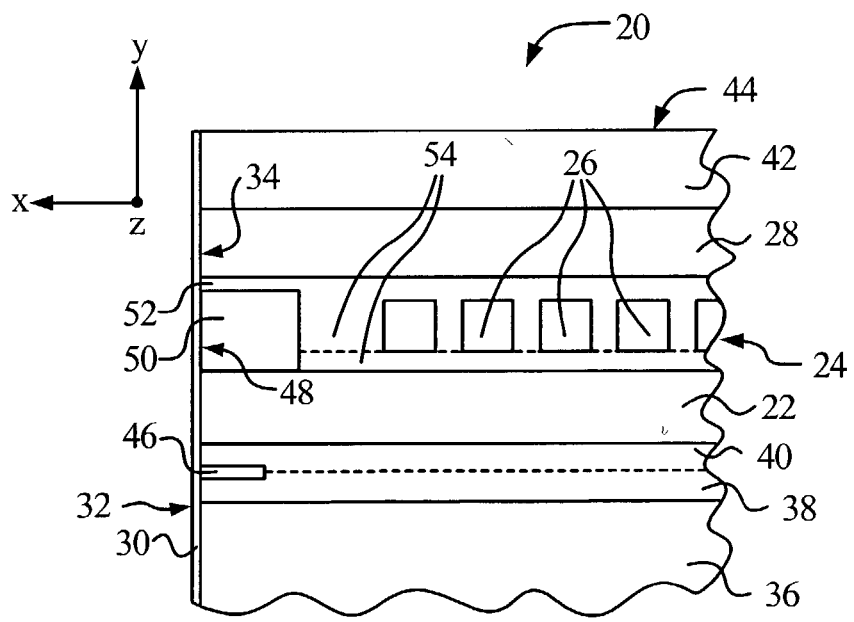
FIG. 1B is a cutaway, cross-sectional view of the transducer of FIG. 1A, showing a pedestal adjacent to and in magnetic contact with a leading pole layer.

FIG. 1B depicts a first embodiment in accordance with the present invention and shows a cutaway cross-sectional view of a merged inductive and magnetoresistive (MR) transducer 20 of a read/write head. Transducer 20 has been formed in a plurality of adjoining solid layers on a wafer substrate, not shown. A first magnetically soft shield layer 36 has been formed adjacent to the wafer substrate. A first layer of nonmagnetic, electrically insulating material 38 is disposed on the shield layer 36, adjoining an MR sensor 46. The MR sensor 46 can be any sensor that utilizes a change in resistance associated with a change in magnetic field to sense that field, which may be measured as a change in current or voltage across the sensor, as the sensor passes over a track on a medium upon which information is stored.

A second layer of nonmagnetic, electrically insulating material 40 is disposed between the MR sensor 46 and a second magnetically soft shield layer. The shield layer also serves as a leading pole layer 22 in this example of a merged read/write head. A magnetically soft leading pedestal 50 is magnetically coupled to the leading pole layer 22.

An electrically conductive coil layer 24 has coil sections 26 that are separated from the leading pole layer 22 by additional nonmagnetic, electrically insulating material 54. The coil sections 26 are substantially parallel in the cross-section shown, and coil layer 24 spirals about a magnetically soft back gap stud, not shown, extending away from a media-facing surface 32 in an area outside that shown in FIG. 1B. Additional coil layers may optionally be formed, for example, as shown in an embodiment in FIG. 9.

A flat trailing pole layer 28 is disposed atop the insulating material 54. The magnetically soft trailing pole layer 28 is composed of high magnetic moment material. The trailing pole layer 28 is coupled to a back gap stud, not shown, so that leading pedestal 50, leading pole layer 22, the back gap stud and trailing pole layer 28 form a magnetic loop substantially encircling and electrically isolated from coil sections 26. The trailing pole layer 28 and the leading pedestal 50 have substantially planar surfaces 34 and 48 adjacent to the recording media. The pole tip surface 48 on leading pedestal 50 is separated from the trailing pole tip surface 34 by a submicron nonferromagnetic gap layer 52. A protective coating layer 42 forms a trailing end 44 of the body. In this design, the media-facing surface 32 lies on a second, thin protective coating layer 30 that protects the MR sensor 46 from damage and corrosion. In another embodiment the pole tip surface 34 may form part of the media-facing surface 32.

The media-facing surface 32 is in close proximity to a relatively moving medium, not shown, such as a spinning disk. The medium moves in a direction indicated by the arrow pointing towards "y", so that a leading end of the body encounters a portion of the moving media before the trailing end encounters that media portion.

FIG. 1A is a cutaway, opened-up view of the transducer 20 from above, showing a double-nosed geometry of the trailing pole layer 28. Also shown are the leading pedestal 50, the coil sections 26 depicted with hash marks, and protective coating 30 that forms the media-facing surface 32. The media-facing surface 32 has a substantially flat face containing the trailing pole tip and extending substantially beyond the trailing pole tip in the z direction.

The double-nosed trailing pole layer 28 has three regions: a trailing pole tip 72 disposed adjacent to the media-facing surface 32, a trailing pole yoke 76 disposed distal to the media-facing surface 32, and a trailing pole nose 74 disposed between the trailing pole tip and trailing pole yoke. The trailing pole tip 72 has sides 60 that are parallel to each other and perpendicular to the media-facing surface 32.

The trailing pole nose 74 has both parallel sides 66 that are parallel to each other and perpendicular to the media-facing surface 32, as well as flared sides 64 that widen from the trailing pole tip width (TPTW) to the trailing pole nose width (TPNW). The flared sides 64 diverge from each other in a track width dimension, shown in FIG. 1A as the z dimension, with increasing distance from the media-facing surface 32. To avoid accumulation of particles that could channel magnetic flux between the nose and the leading pole tip, it may be desirable for the media-facing surface to be substantially flat on both sides of the trailing pole tip, at least as far as the width of the nose. The media-facing surface adjacent the trailing pole tip may have a substantially flat face for a width at least as great as the TPNW.

The trailing pole yoke 76 also has both parallel sides 70 that are parallel to each other and perpendicular to the media-facing surface 32, as well as flared sides 68 that widen from the trailing pole nose width (TPNW) to the trailing pole yoke width (TPYW). The flared sides 68 diverge from each other in the z dimension with increasing distance from the media-facing surface 32.

Figure 1C:
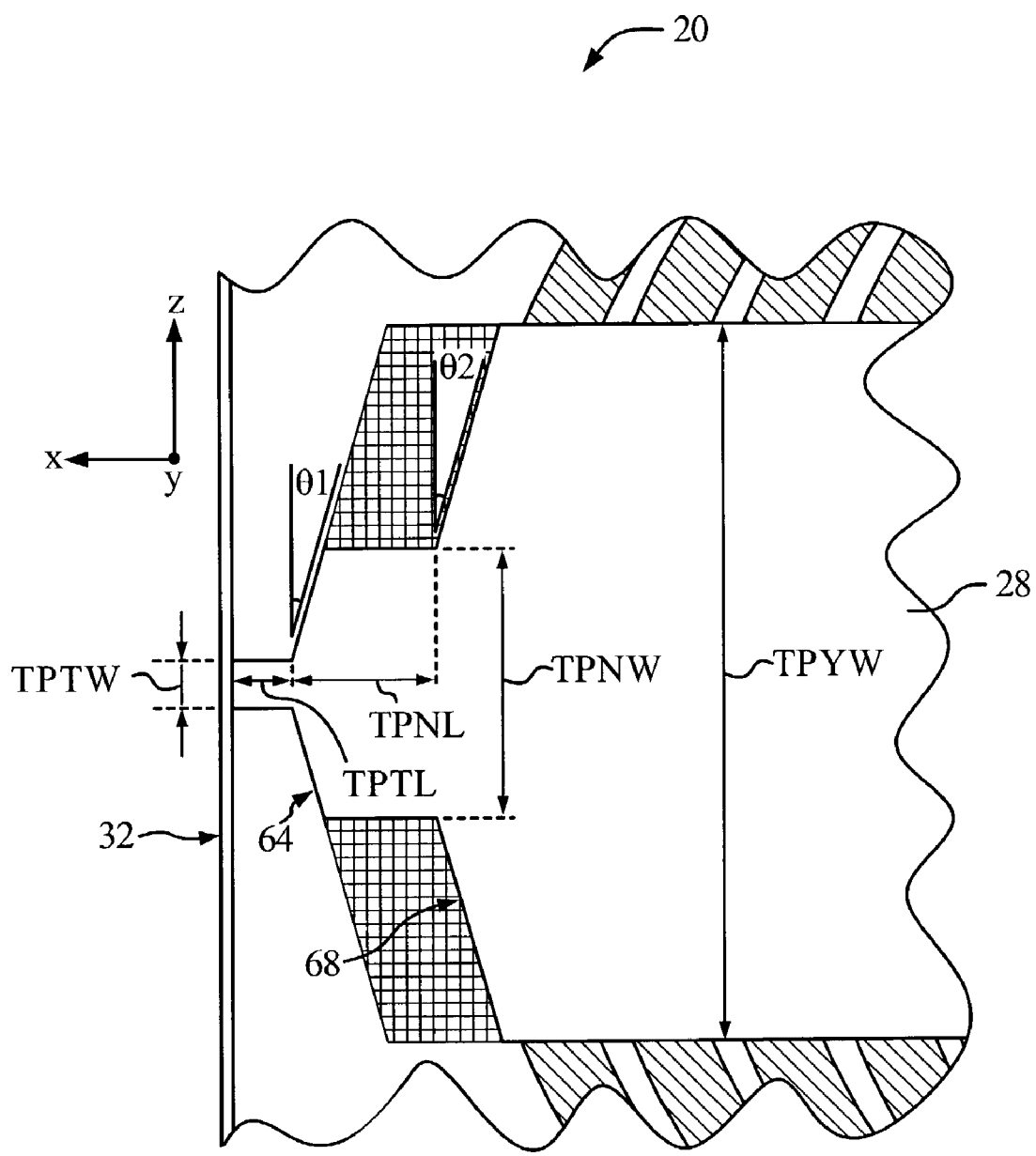
FIG. 1C is a cutaway, opened-up view of the transducer as in FIG. 1A labeling the dimensions of the pole tip, pole nose and pole yoke.

FIG. 1C labels the dimensions of the trailing pole layer 28, including the trailing pole tip width (TPTW), the trailing pole tip length (TPTL), the trailing pole nose width (TPNW), the trailing pole nose length (TPNL), a trailing pole yoke width (TPYW), an angle θ1 between a plane parallel to the media-facing surface and the flared sides 64, and an angle θ2 between a plane parallel to the media-facing surface and the flared sides 68.

Figure 1D:
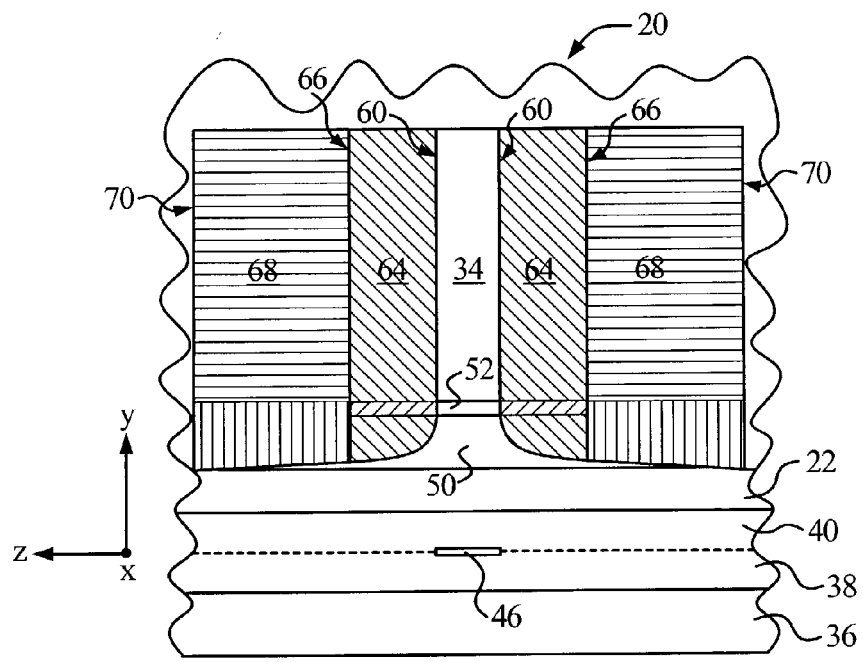
FIG. 1D is a cutaway, cross-sectional view of the transducer of FIG. 1A and FIG. 1B.

FIG. 1D is a cut-away, cross-sectional view from the media-facing surface of the transducer 20. Both the diverging flared sides 64 of the trailing pole nose 74, as well as the diverging flared sides 68 of the trailing pole yoke 76, are depicted with hash marks.

Figure 1E:
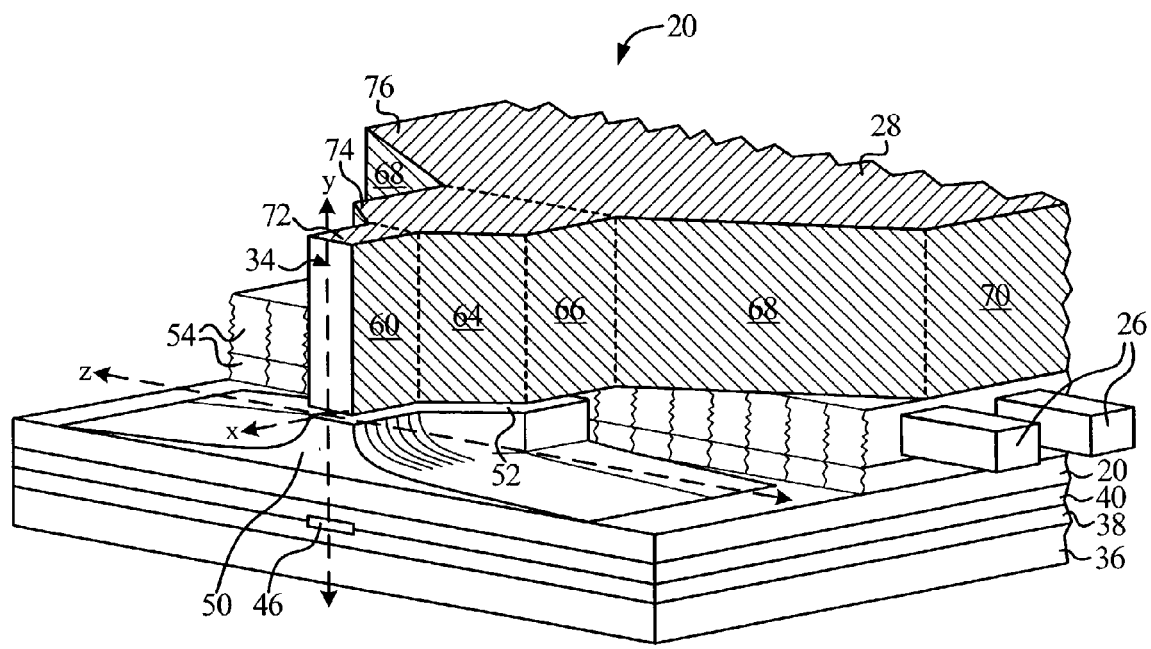
FIG. 1E is a schematic perspective view of the transducer of FIG. 1A, FIG. 1B and FIG. 1D.

FIG. 1E is a schematic perspective view of the transducer 20. Also shown are axes x, y and z. The recording media moves past transducer 20 in said y direction. The z axis lies on the media-facing surface, not shown in FIG. 1E, and along the track-width direction. The y axis is orthogonal to the media-facing surface, is perpendicular to both the z axis and the y axis, and intersects both the z axis and the y axis. The intersection of the x, y and z axes lies on the media-facing surface and is centered over the submicron nonferromagnetic gap 52.

The double-nosed geometry of the trailing pole layer 28 increases the amount of the high magnetic moment material in the pole layer that can be placed near the pole tip surface without increasing off-track writing produced by such material. The double-nosed geometry reduces leakage of magnetic flux onto the recording media from areas of the trailing pole layer other than the pole tip surface. Where a conventional trailing pole layer geometry, such as one of the geometries shown in FIGS. 2A–E, is employed in a transducer having a pedestal coupled to a leading pole layer, the off-track writing results from magnetic flux leakage to the pedestal from the trailing pole layer.

Off-track writing is significantly reduced with the double-nosed geometry of the flat trailing pole layer shown in FIG. 1 because material from the trailing pole layer has been moved away from the media-facing surface. Using a finite element model (FEA) with a write current of 40 mA, the off-track write field at the edge of the leading pedestal is 2650 Oe using a double-nosed trailing pole layer capable of producing a 9400 Oe write field on a narrow trackwidth of 0.28 µm on longitudinal recording media with coercivity of 6000 Oe. When a conventional pole geometry of the shape shown in FIG. 2A was used with a flare angle θ3 of 15°, the write field on the narrow trackwidth of 0.28 µm is 9600 Oe, i.e., only 2% stronger. With the conventional pole geometry, however, the off-track write field at the edge of the leading pedestal increases to 4365 Oe. Thus, off-track writing is reduced about 35% without significantly reducing on-track writing by using the double-nosed trailing pole layer shown in FIG. 1.

Figure 2A:
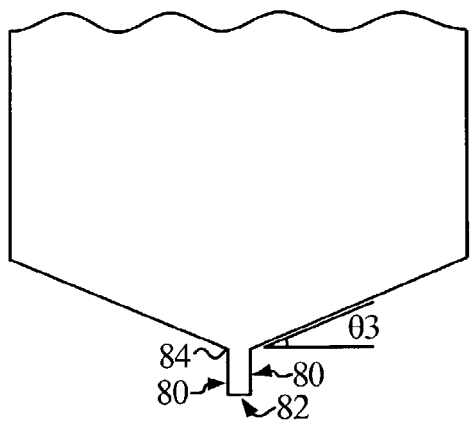
FIGS. 2A–D (each prior art) depict geometries of pole layers in which, after a flare point, the width of each pole layer increases more or less at a steady rate extending away from the pole tip surface.
Figure 2B:
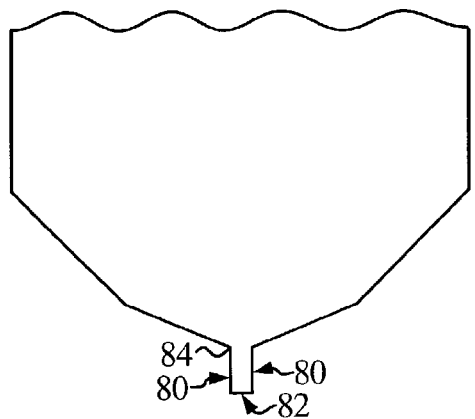
Figure 2C:
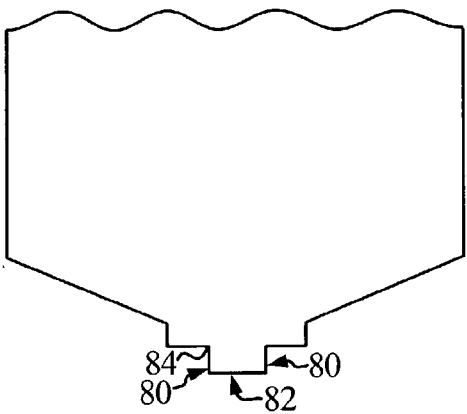
Figure 2D:
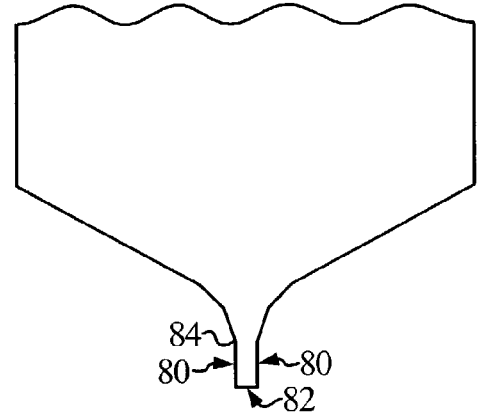
Figure 3:
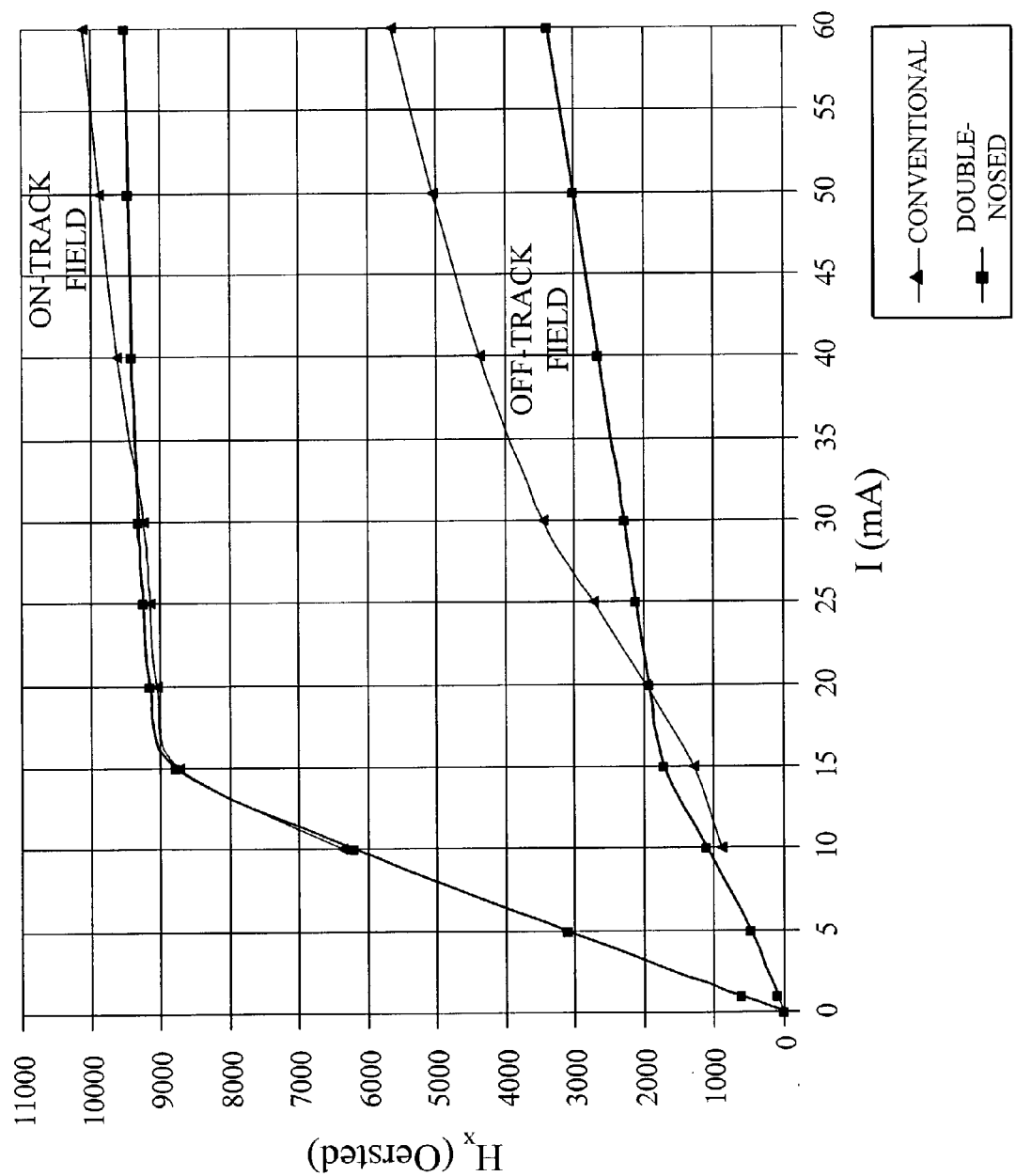
FIG. 3 is a graph of illustrating write-saturation in Oersted at various currents for on-track and off-track fields and for conventional and double-nosed trailing pole layers.

FIG. 3 is a graph comparing the write fields in Oersted at various currents for on-track and off-track fields achieved by a transducer with a conventional trailing pole layer geometry of the shape shown in FIG. 2A and by a double-nosed trailing pole layer. The curves in FIG. 3 include the results at 40 mA described above.

The on-track field in FIG. 3 is measured from the point: x=–2.5 µm, y=0, z=0. The off-track field is measured at: x=–2.5 µm, y=–4.0, z=–4.0. For both conventional and double-nosed pole layer geometries, at low write currents (below about 15 mA) the pole tips do not saturate, and increasing the write current through the coil sections increases the on-track magnetic field without significantly increasing the off-track magnetic field. Above about 15 mA, however, the on-track magnetic fields for pole layers of both geometries begin to saturate, and increasing the write current produces a smaller proportionate increase in the on-track field, as seen by the flatter curves above 15 mA.

The off-track magnetic field for pole layers with conventional geometries does not saturate, and increasing the write current beyond 15 mA results in a more or less linear increase in the off-track magnetic field. The off-track magnetic field for double-nosed pole layers, however, begins to saturate beyond about 15 mA of write current, and increasing the write current produces a smaller proportionate increase in the off-track field 15 mA.

The double-nosed pole layer, therefore, permits write currents to be used that may reach levels significantly higher than 15 mA, while at the same time keeping the off-track write field within a desired limit, for example, under 3500 Oe. Using higher write currents can have advantages, such as increasing the speed of writing onto the recording media. The on-track write field can be increased to 50 mA with a double-nosed pole layer, for example, without resulting in an off-track write field of more than 3000 Oe. The off-track write field with a conventional pole layer at the same write current would be 5000 Oe.

The dimensions of the double-nosed trailing pole layer that were used for the aforementioned modeling were: trailing pole tip width (TPTW) 0.28 µm; trailing pole tip length (TPTL) 0.5 µm; trailing pole nose width (TPNW) 2.0 µm; trailing pole nose length (TPNL) 3.0 µm; trailing pole yoke width (TPYW) 20 µm; and trailing pole yoke length of about 40 µm. The angle θ1 by which the flared sides 64 diverge away from parallel to the media-facing surface was about 35°, as was the angle θ2 by which the flared sides 68 diverge away from parallel to the media-facing surface. The conventional pole layer used in the modeling also had a flare angle of 35°, as illustrated by angle θ3 in FIG. 2A.

Figure 4A:
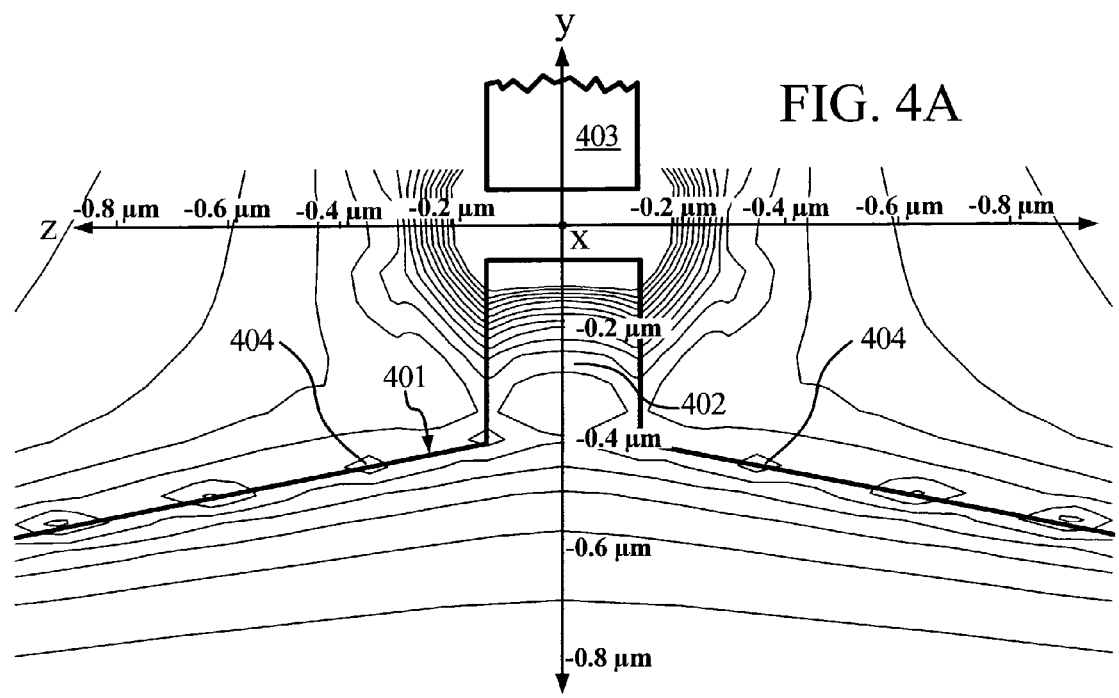
FIG. 4A illustrates the strength of the magnetic field projected onto the recording media surface from a double-nosed trailing pole layer.

FIG. 4A illustrates the strength of the off-track magnetic field surrounding the leading pedestal obtained from the aforementioned modeling for a double-nosed trailing pole layer 403. As in FIG. 1D, the view in FIG. 4A is from the x dimension. The 2650 Oe off-track write field at 40 mA appears at locations 404 on an upper edge 401 of the leading pedestal 402 that are at about 0.4 µm and –0.4 µm in the z dimension.

Figure 4B:
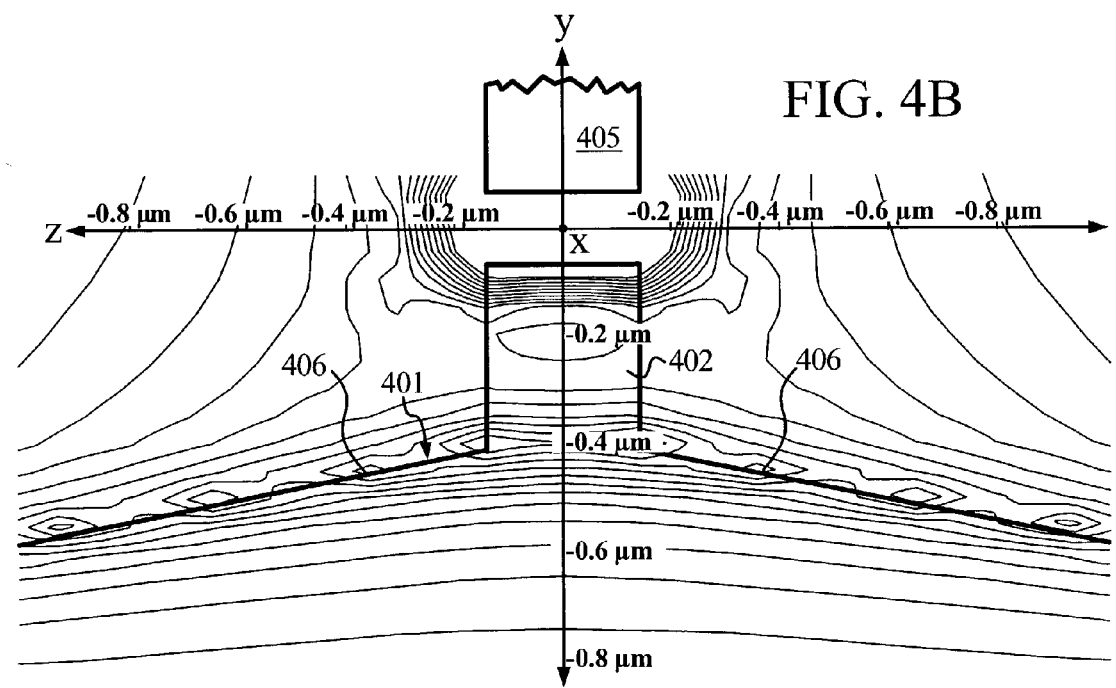
FIG. 4B illustrates the strength of the magnetic field projected onto the recording media surface from a trailing pole layer of conventional geometry.

FIG. 4B illustrates the strength of the off-track magnetic field surrounding the leading pedestal 402 obtained from the aforementioned modeling using a conventional trailing pole layer 405 with the geometry of the shape shown in FIG. 2A. The larger 4365 Oe off-track write field appears at locations 406 on an upper edge 401 of the leading pedestal 402 that are at about 0.4 µm and –0.4 µm in the z dimension.

Figure 5:
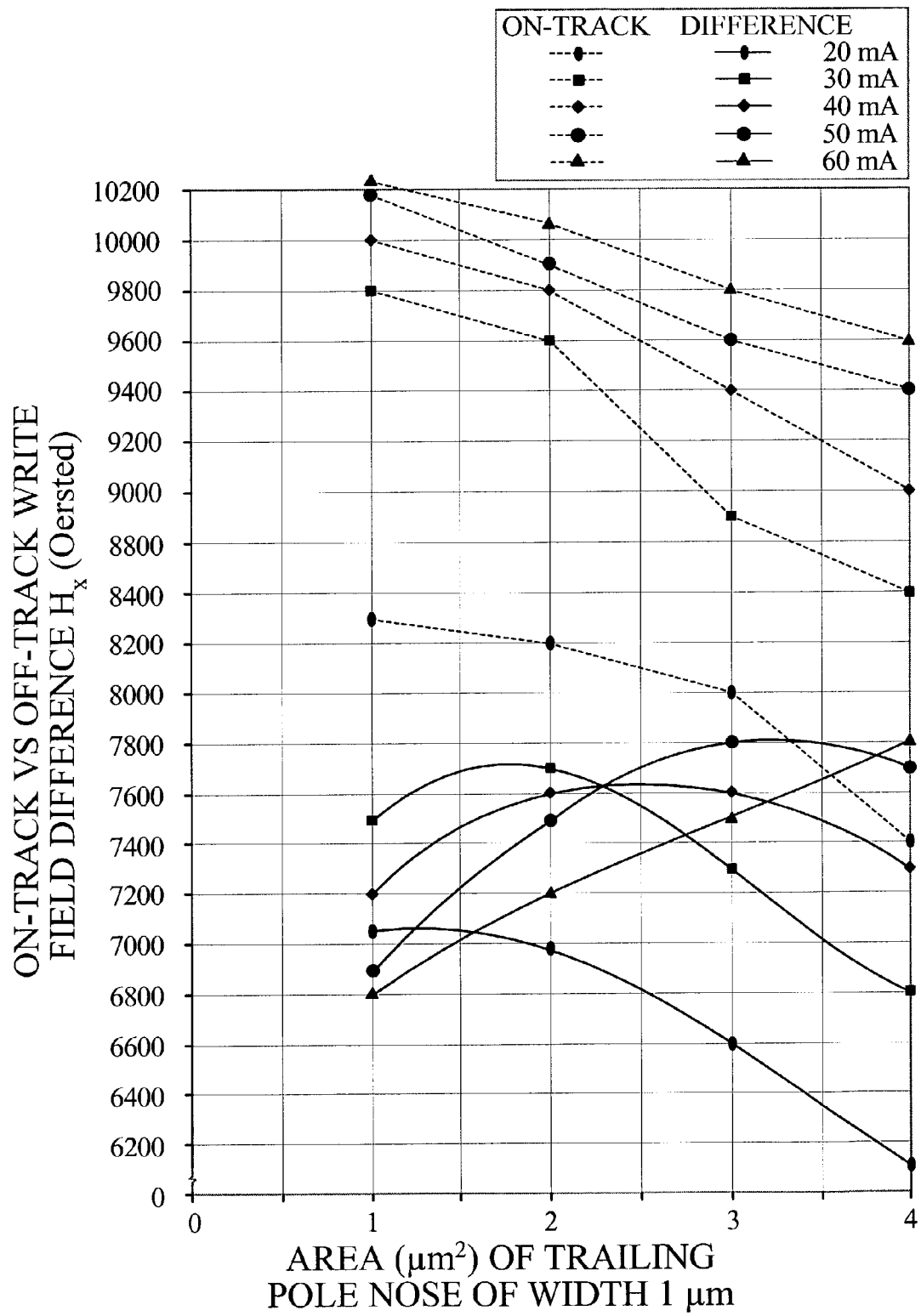
FIG. 5 is a graph comparing the on-track and off-track write fields produced with double-nosed trailing pole layers with trailing pole noses of varying sizes.

FIG. 5 is a graph comparing the on-track and off-track write fields at various write currents produced with double-nosed trailing pole layers having trailing pole noses with varying cross-sectional areas. The trailing pole layers are made of material having a magnetic moment of 5 Tesla. For a trailing pole layer with a trailing pole nose width of 1 µm, the maximum difference between on-track and off-track write fields can be achieved with a trailing pole nose having an area in a range between about 1 µm$^2$ and 5 µm$^2$.

For increasing write currents, the area of the trailing pole nose that yields the maximum difference between on-track and off-track write fields increases. In FIG. 5, the on-track and off-track write fields are compared at write currents of 20–60 mA. For a write current of 20 mA, the maximum difference between on-track and off-track fields is achieved with a trailing pole nose having an area between 1 µm$^2$ and 2 µm$^2$. For a write current of 50 mA, the maximum difference between on-track and off-track fields is achieved with a trailing pole nose having an area between 2.5 µm$^2$ and 3.5 µm$^2$.

In addition to the difference in on-track and off-track write fields, FIG. 5 also shows the on-track write fields at the indicated write currents. In order to improve the density with which data can be written to a recording media, it is not generally sufficient to maximize the difference between the on-track and off-track fields if, in doing so, the on-track write field is reduced below a desired level. For example, if an on-track write field of at least 9800 Oe is desired using a write current of 40 mA, then the trailing pole nose geometry that yields the largest difference between on-track and off-track fields should not be used because that geometry reduces the on-track write field below 9800 Oe.

Figure 6:
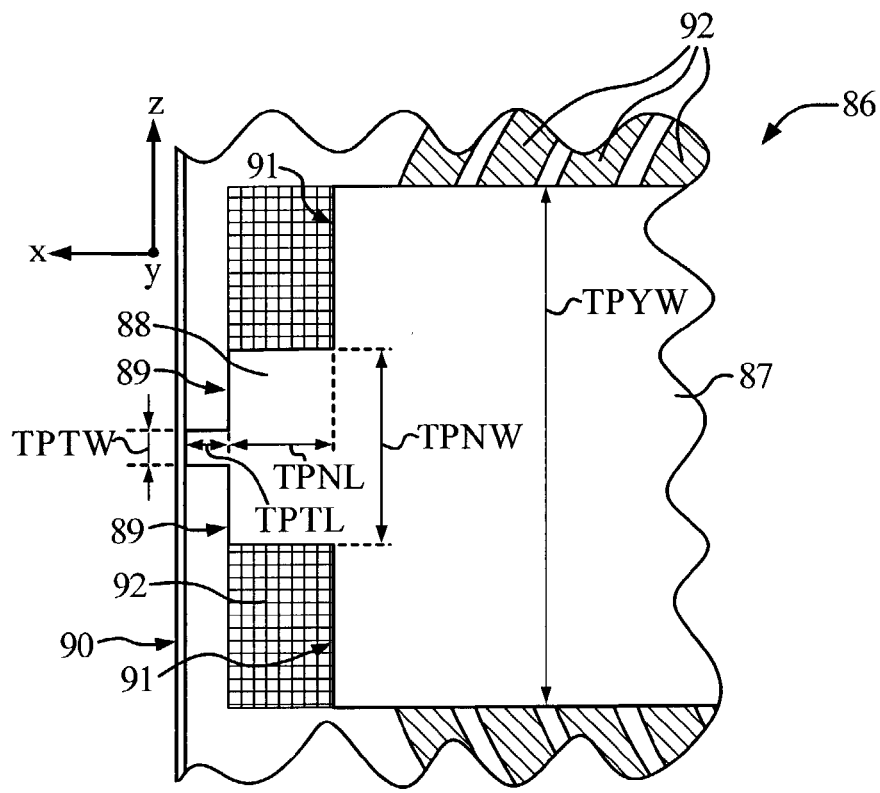
FIG. 6 is a cutaway, opened-up view of a transducer having a double-nosed pole layer with perpendicular sides, as opposed to the flared sides of FIG. 1A.

FIG. 6 is a cutaway, opened-up view from above of transducer 86 in another embodiment. FIG. 6 shows the double-nosed geometry of a trailing pole layer 87, having a trailing pole nose 88 with sides 89 that are not flared, but rather parallel to media-facing surface 90. Sides 91 are also parallel to the media-facing surface 90 and widen from the trailing pole nose width (TPNW) to the trailing pole yoke width (TPYW). Also shown is leading pedestal 92 below trailing pole layer 87.

Figure 7:
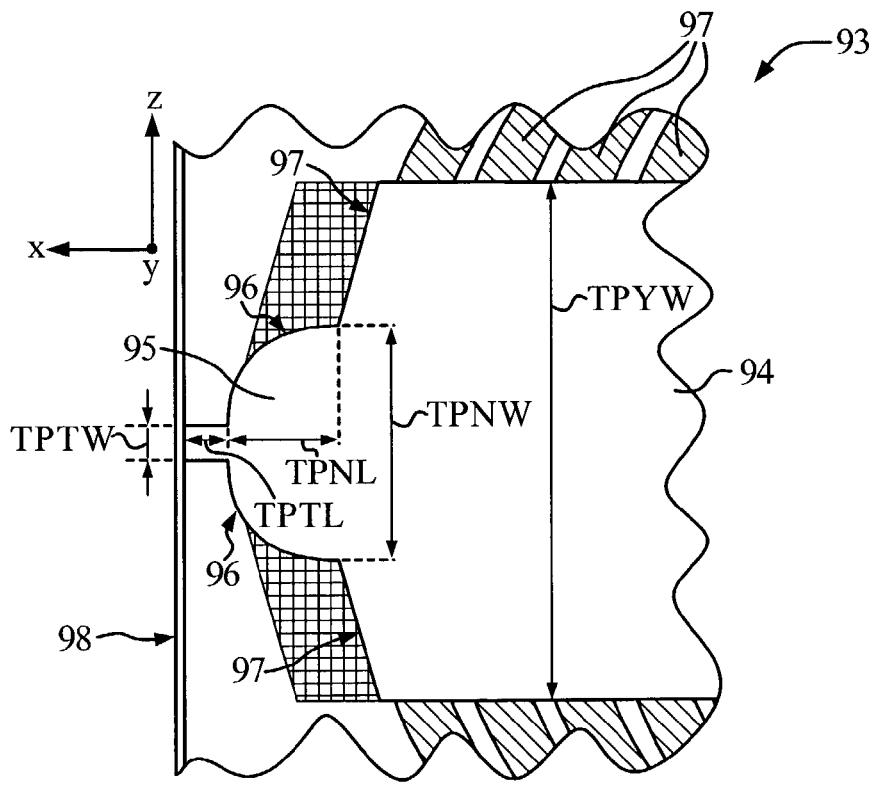
FIG. 7 is a cutaway, opened-up view of a transducer having a double-nosed pole layer with rounded sides, as opposed to the perpendicular sides of FIG. 3.

FIG. 7 is a cutaway, opened-up view from above of transducer 93 in another embodiment. FIG. 7 shows the double-nosed geometry of a trailing pole layer 94, having a trailing pole nose 95 with convex rounded sides 96. The area of trailing pole nose 95 is at least 75% of the area calculated by multiplying the trailing pole nose length (TPNL) by the trailing pole nose width (TPNW). Planar flared sides 97 diverge from each other in the z dimension with increasing distance from the media-facing surface 98 and widen from the trailing pole nose width (TPNW) to the trailing pole yoke width (TPYW).

Figure 8A:
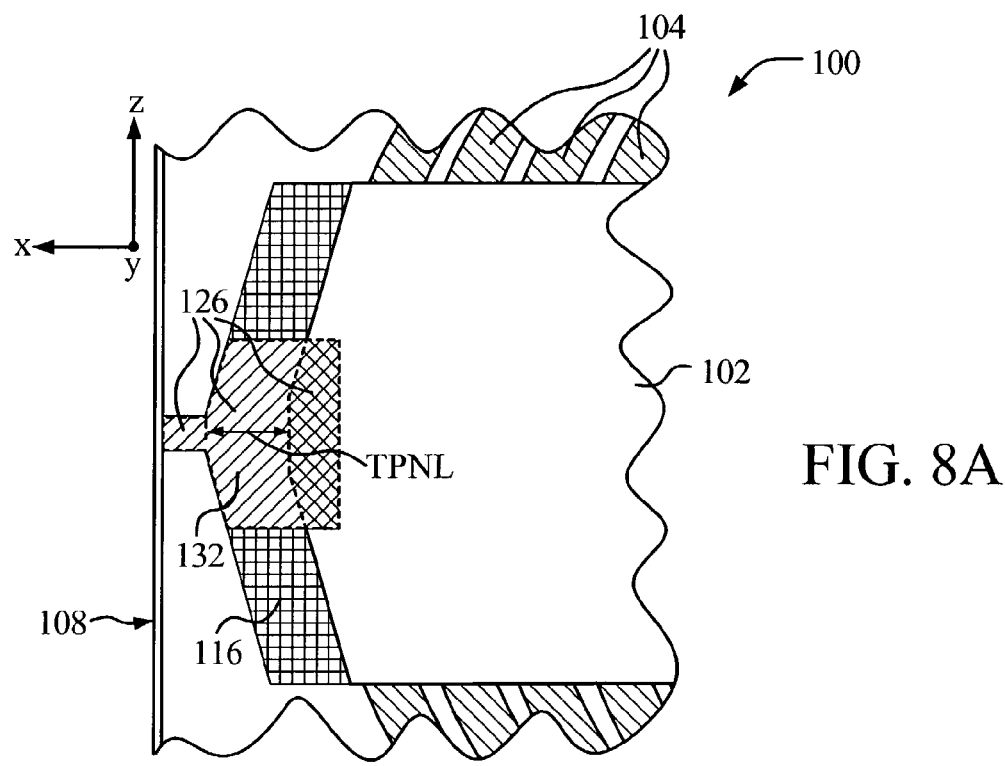
FIG. 8A is a cutaway, opened-up view of a transducer having a double-nosed pole layer with a pedestal adjacent to and in magnetic contact with a trailing pole layer.

FIG. 8A depicts yet another embodiment of a merged inductive and magnetoresistive (MR) transducer 100 having a double-nosed trailing pole layer. This embodiment includes a magnetically soft trailing pedestal 126 that is magnetically coupled to a trailing pole layer 102. Two portions of a trailing pedestal 126 are represented by cross-hatching and diamond-hatching. The diamond-hatching represents the portion of the trailing pedestal 126 that lies below trailing pole layer 102. In this embodiment, a trailing pole nose 132 is formed by the trailing pedestal 126 and not by the trailing pole layer 102. The structure in this embodiment enables the trailing pole nose 132 to be made of material with different magnetic moment than that of the trailing pole yoke, which is substantially formed by the trailing pole layer 102. Also shown are leading pole layer 116 (represented by square-hatching), coil sections 104 and media-facing surface 108.

Figure 8B:
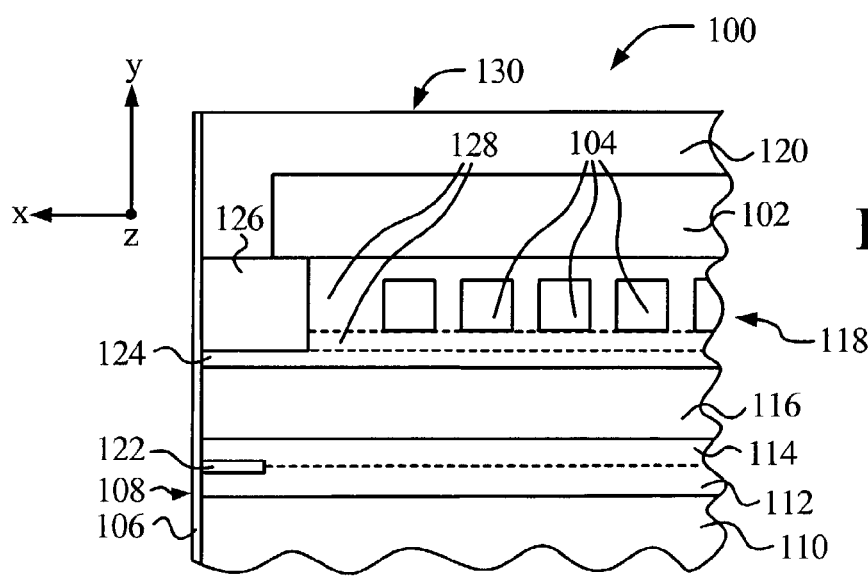
FIG. 8B is a cutaway, cross-sectional view of the transducer of FIG. 8A.

FIG. 8B is a cutaway, cross-sectional view of the transducer 100 of FIG. 8A. As with transducer 20 shown in FIG. 1B, transducer 100 also has a magnetically soft shield layer 110, electrically insulating material 112 and 114, an MR sensor 122, leading pole layer 116, and a coil layer 118 with coil sections 104 that are separated from the leading pole layer 116 by electrically insulating material 128.

Trailing pole layer 102 is disposed atop the insulating material 128. Trailing pole layer 102 is flat and does not extend all the way to media-facing surface 108. Magnetically soft trailing pedestal 126 extends to a coating layer 106 that forms the media-facing surface 108, and the trailing pedestal is magnetically coupled to trailing pole layer 102. Trailing pedestal 126 and leading pole layer 116 are separated by a submicron gap layer 124. Another protective coating layer 120 forms a trailing end 130 of the transducer 100.

A double-nosed trailing pole layer can also be formed using a trailing pedestal and a curved trailing pole layer. A curved trailing pole layer might be employed, for example, to cover multiple coil layers.

Figure 9:
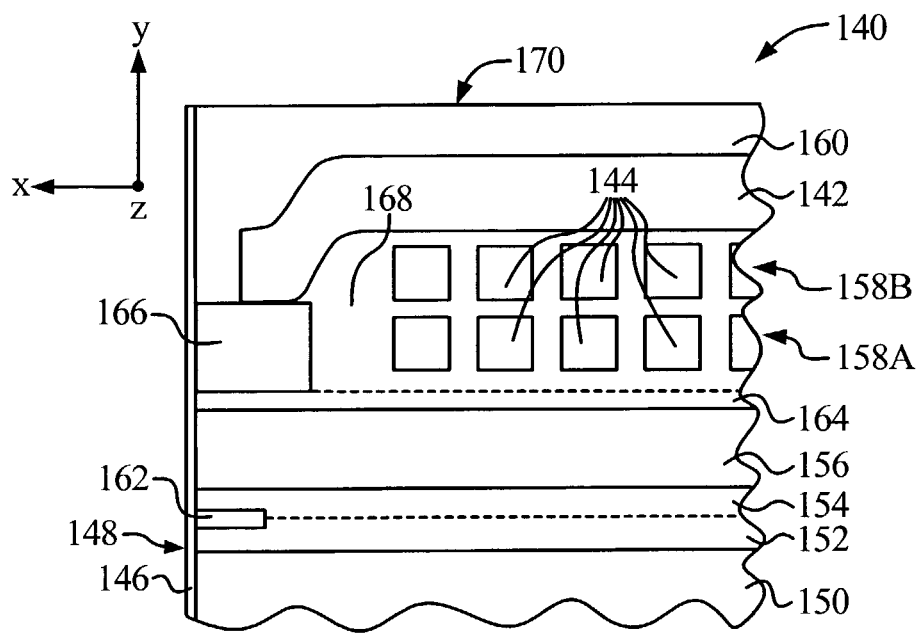
FIG. 9 is a cutaway, cross-sectional view of an inductive transducer with a pedestal adjoining a trailing pole layer, where the trailing pole layer is curved to cover two layers of coil windings and insulation disposed between the pole layers.

FIG. 9 shows a cutaway, cross-sectional view of another embodiment, wherein transducer 140 has two electrically conductive coil layers 158A and 158B, which have coil sections 144 that are separated from a trailing pole layer 142 by electrically insulating material 168. Trailing pole layer 142 is curved to cover the two coil layers 158A and 158B and the insulating material 168. Trailing pole layer 142 does not extend all the way to a protective coating 146 that forms a media-facing surface 148.

As with transducer 100 in FIG. 8, transducer 140 has a trailing pole nose that is formed by a trailing pedestal 166 and not by the trailing pole layer 142. Trailing pedestal 166 extends to coating layer 146 and is magnetically coupled to trailing pole layer 142.

Also shown in FIG. 9 are a shield layer 150, electrically insulating material 152 and 154, an MR sensor 162, a leading pole layer 156, a submicron gap layer 164 formed with part of insulating material 168, and a protective coating layer 160 that forms a trailing end 170 of the transducer 140.

The first embodiment shown in FIG. 1B has a trailing pole layer 28 that is not comprised of sublayers. Other embodiments are possible, however, wherein a trailing pole structure is comprised of more than one layer. Each layer of the trailing pole structure can be composed of material having a different magnetic moment.

Figure 10:
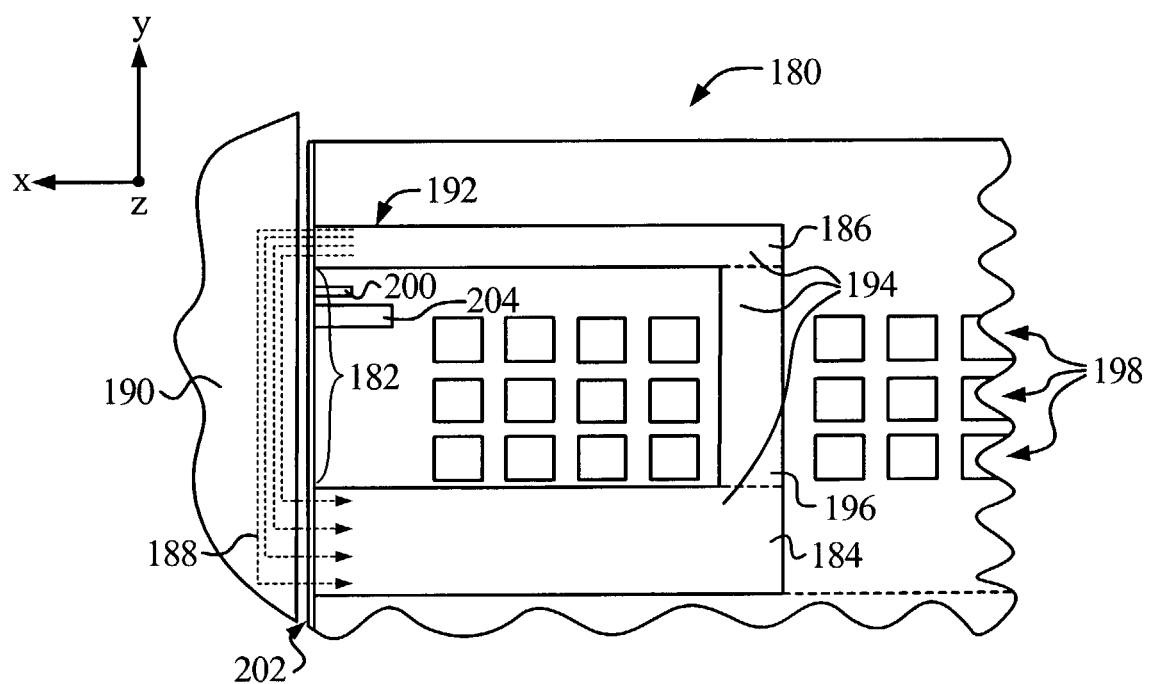
FIG. 10 is a cutaway, cross-sectional view of an inductive transducer in which a gap between a leading pole tip surface and a trailing pole tip surface is at least several times larger than the distance between a media-facing surface of the inductive transducer and a recording media.

A double-nosed trailing pole layer can also be used in a perpendicular recording configuration, such as transducer 180 in FIG. 10. The embodiments depicted in FIGS. 1, 6, 7 and 8 produce longitudinal magnetic recording fields that are parallel to the recording media at the point at which information is written onto the recording media. The embodiment shown in FIG. 10, on the other hand, produces a perpendicular recording field. A gap distance 182 between a leading pole layer 184 and a trailing pole layer 186 is considerably wider than the submicron gap layers in FIGS. 1B and 8B, so that the magnetic flux 188 of the recording field is perpendicular to the recording media 190 at the point adjacent to the trailing edge 192 of the trailing pole layer 186 at which information is written onto the recording media. The ratio of the on-track write field to the off-track write field produced by transducer 180 can be increased by employing the double-nosed pole layer geometry to trailing pole layer 186.

Transducer 180 in FIG. 10 has a generally U-shaped ferromagnetic core 194 that includes the relatively large leading pole layer 184 through which magnetic flux is returned, the smaller trailing pole layer 186 through which the magnetic flux emanates that writes on the recording media 190, and a magnetic stud 196 that connects the pole layers 184 and 186. A conductive coil 198, including three layers in this embodiment, winds around the magnetic stud 196. An MR sensor 200 is disposed adjacent a media-facing surface 202 between a magnetically soft shield layer 204 and the trailing pole layer 186.

A transducer in accordance with the present disclosure may be formed as taught in U.S. patent application Ser. No. 09/999,694, filed Oct. 24, 2001 by inventors Yingian Chen et al. and incorporated by reference herein. In addition, by precisely aligning the pole layers and the nose with the MR sensor, it is possible to lap the media-facing surface of the pole tips by the precise amount required to achieve a desired proximity between the nose and the media-facing surface. Precise alignment can be achieved by using a field alignment mark on the lowest layer. Masks for subsequently deposited layers are then always aligned to the same field alignment mark on the lowest layer so that misalignment errors are not compounded when each subsequent layer contains the alignment marks for the layer above.

Although the present invention is described in connection with specific embodiments for instructional purposes, the present invention is not limited thereto. The terms leading and trailing are relative to one another and are otherwise not limiting. The sides of the trailing pole nose need not be planar surfaces, and there need be no parallel sides of the trailing pole nose, in order to place the critical amount of trailing pole layer material that is required for the desired on-track write field sufficiently far from the media-facing surface to reduce substantially the off-track write field. Accordingly, various modifications, adaptations and combinations of various features of the described embodiments can be practiced without departing from the scope of the invention as set forth in the following claims.

The invention claimed is:

1. A device having a leading end, a trailing end and a media-facing surface, said device extending in a y direction from said leading end to said trailing end, in an x direction substantially orthogonal to said media-facing surface and in a z direction perpendicular to both said x direction and said y direction, said device comprising:

an electrically conductive coil including a plurality of coil sections disposed adjacent to each other;

a ferromagnetic leading pole layer disposed adjacent to said coil sections and extending in said x direction and in said z direction;

a ferromagnetic trailing pole layer disposed adjacent to said coil sections and extending in said x direction and in said z direction, said trailing pole layer having a trailing pole yoke width in said z direction; and a trailing pedestal disposed adjacent to said trailing pole layer and to the media-facing surface, said trailing pedestal disposed between said leading pole layer and said trailing pole layer, said trailing pedestal having a trailing pole tip disposed adjacent to said media-facing surface and a trailing pole nose disposed distal to said media-facing surface, said trailing pole tip having a trailing pole tip width in said z direction that corresponds to a track width and having a trailing pole tip length in said x direction, said trailing pole tip having two substantially planar trailing pole tip sides each oriented substantially parallel to an xy plane, said trailing pole nose having a trailing pole nose length in said x direction that is at least twice as large as said trailing pole tip length, further having a trailing pole nose width in said z direction that is at least twice as large as said trailing pole tip width, wherein the trailing pedestal and the trailing pole layer have different material compositions.

2. The device of claim 1, wherein the media-facing surface has a substantially flat face adjoining said trailing pole tip and extending beyond said trailing pole tip in said z direction.

3. The device of claim 1, wherein said trailing pole layer is elongated in said x direction and in said z direction and is curved about said coil sections.

4. The device of claim 1, wherein said trailing pedestal is separated from said leading pole layer adjacent to the media-facing surface by a submicron nonferromagnetic gap.

5. The device of claim 4, wherein said trailing pedestal is separated from said leading pole layer adjacent to the media-facing surface by plural microns of nonferromagnetic material.

6. The device of claim 1, wherein the media-facing surface has a substantially flat face adjacent to said trailing pole tip, said face extending at least as far in said z direction as said trailing pole nose width.

* * * * *